(12) United States Patent
Liang et al.

(10) Patent No.: US 12,510,873 B2
(45) Date of Patent: Dec. 30, 2025

(54) POWER CONTROL SYSTEM AND POWER CONTROL METHOD THEREOF

(71) Applicant: Yung-Chang Liang, Taipei (TW)

(72) Inventors: Yung-Chang Liang, Taipei (TW); Shu-Hui Tien, Taipei (TW)

(73) Assignee: XMIGHT CORPORATION, Taipei (TW)

( * ) Notice: Subject to any disclaimer, the term of this patent is extended or adjusted under 35 U.S.C. 154(b) by 394 days.

(21) Appl. No.: 18/106,837

(22) Filed: Feb. 7, 2023

(65) Prior Publication Data

US 2023/0251616 A1 Aug. 10, 2023

(30) Foreign Application Priority Data

Feb. 8, 2022 (TW) .................................. 111104585

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; Y04S 20/222
See application file for complete search history.

(56) References Cited

U.S. PATENT DOCUMENTS

| | | | | |
|---|---|---|---|---|
| 2012/0095606 | A1* | 4/2012 | Besore | A47L 15/0047 700/291 |
| 2012/0209445 | A1* | 8/2012 | Kim | H04L 12/2827 700/296 |
| 2013/0151024 | A1* | 6/2013 | Bae | H02J 3/14 700/295 |
| 2019/0155231 | A1* | 5/2019 | Weng | G06Q 50/06 |

FOREIGN PATENT DOCUMENTS

| | | | | |
|---|---|---|---|---|
| CN | 103119816 | A | 5/2013 | |
| KR | 101690124 | B1 * | 12/2016 | ............. G06Q 20/14 |
| TW | 201330440 | A1 | 7/2013 | |
| TW | 201926220 | A | 7/2019 | |

* cited by examiner

*Primary Examiner* — Kidest Worku
(74) *Attorney, Agent, or Firm* — Birch, Stewart, Kolasch & Birch, LLP

(57) ABSTRACT

A power control system includes a processing module, a database, and a control module. A power control method thereof includes: obtain an electricity consumption of loads from the electricity consumption metering device through a processing module, and generate a scheduled electricity consumption status in an electricity consuming period of the electricity consuming field; the scheduled electricity consumption status includes a peak period and an off-peak period; create a load data in the database; the load data sorts the loads into a first electricity consuming group and a second electricity consuming group; the loads of the first electricity consuming group are defined as an essential load, and the loads of the second electricity consuming group are (Continued)

defined as a non-essential load; control the loads of the second electricity consuming group to run during the off-peak period through a control module based on the load data and the scheduled electricity consumption status.

8 Claims, 8 Drawing Sheets

POWER CONTROL SYSTEM AND POWER CONTROL METHOD THEREOF

BACKGROUND OF THE INVENTION

Technical Field

The present invention relates generally to power consumption control of the load, and more particularly to a power control system and a power control method thereof.

Description of Related Art

A general electricity consuming field, such as a community building, an office building, a factory, etc., is illustrated in FIG. 1 and provides a plurality of loads 100, wherein each of the loads 100 is connected to a power grid via an electric meter 102 and a switch device 104. The switch device 104 is an overload protection switch for tripping when a passing current is greater than a predetermined current, thereby stopping supplying power to the loads 100 in the electricity consuming field, so as to maintain a safety of power supply.

However, people's demand for electricity increases year by year, and the number of the loads 100 in the electricity consuming field also increases. For example, a vehicle charging station is newly added in an old electricity consuming field, and in a situation where a large number of the loads 100 are activated at the same time, the power consumption may be too large, resulting in the switching device 104 tripping. In a case that there is a contract electricity capacity between the electricity consuming field and an electric power company, an instantaneous electricity consumption may exceed the electric quantity specified in the contract electricity capacity when a large number of these loads 100 are activated at the same time, so that the owner of the electricity consuming field needs to pay extra electricity bills.

BRIEF SUMMARY OF THE INVENTION

In view of the above, the primary objective of the present invention is to provide a network switch, which could display a state of a network connection port with multiple LED combinations.

The present invention provides a power control system, which is applied to an electricity consuming field, wherein an electricity consumption metering device and a plurality of loads are disposed in the electricity consuming field. The loads are connected to a power grid via the electricity consumption metering device, and the electricity consumption metering device is configured to record an electricity consumption of the loads. The power control system includes a processing module, a database, and a control module. The processing module is wirelessly connected to the electricity consumption metering device for obtaining the electricity consumption of the loads, wherein the processing module generates a scheduled electricity consumption status in at least one electricity consuming period of the electricity consuming field according to the obtained electricity consumption that the loads operate for a period of time. The scheduled electricity consumption status includes a peak period and an off-peak period. A load data is stored in the database and sorts the loads into at least a first electricity consuming group and a second electricity consuming group. The loads of the first electricity consuming group are allowed to operate during both the peak period and the off-peak period. The loads of the second electricity consuming group selectively operate during the peak period or the off-peak period. The control module is wirelessly connected to the loads, the processing module, and the database, wherein the control module controls the loads of the second electricity consuming group to run during the off-peak period based on the load data and the scheduled electricity consumption status.

The present invention further provides a power control method, which is applied to an electricity consuming field, wherein an electricity consumption metering device and a plurality of loads are disposed in the electricity consuming field. The loads are connected to a power grid via the electricity consumption metering device, and the electricity consumption metering device is configured to record an electricity consumption of the loads. The power control method includes following steps:

obtain the electricity consumption of the loads from the electricity consumption metering device through a processing module, and generate a scheduled electricity consumption status in at least one electricity consuming period of the electricity consuming field according to the obtained electricity consumption that the loads operate for a period of time through the processing module, wherein the scheduled electricity consumption status comprises a peak period and an off-peak period;

create a load data that sorts the loads into at least a first electricity consuming group and a second electricity consuming group, wherein the loads of the first electricity consuming group are allowed to operate during both the peak period and the off-peak period, while the loads of the second electricity consuming group selectively operate during the peak period or the off-peak period;

a control step includes control the loads of the second electricity consuming group to run during the off-peak period through a control module based on the load data and the scheduled electricity consumption status.

With the aforementioned design, the loads of the second electricity consuming group could be controlled to restrict the loads of the second electricity consuming group to operate during the off-peak period, so as to avoid the excessive load operation during the peak period that may cause the excessive power consumption, thereby effectively avoiding the situation that the switch device trips or the instantaneous electricity consumption exceeds the electric quantity specified by the contract electricity capacity.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
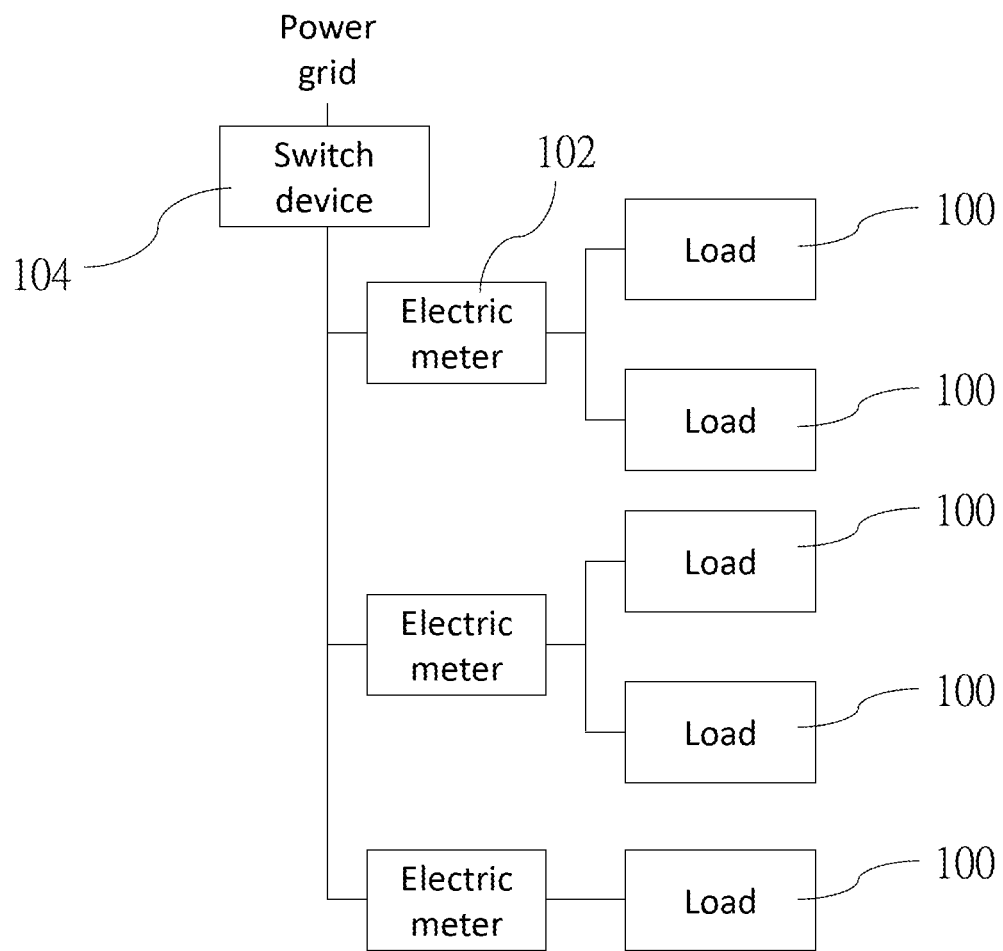
FIG. 1 is a block diagram, showing the loads of the conventional electricity consuming field are connected to the power grid.
Figure 2:
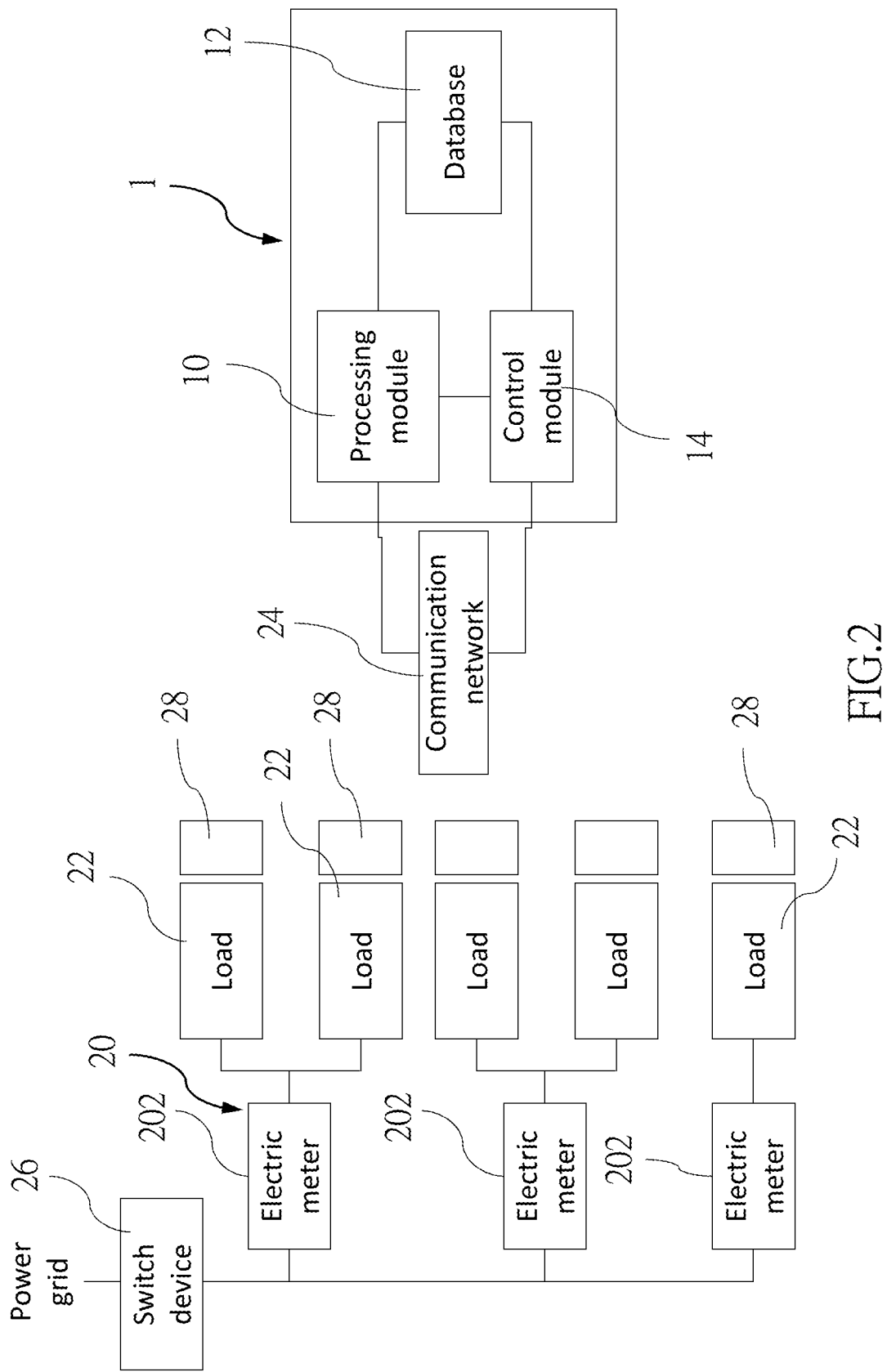
FIG. 2 is a block diagram, showing both of the power control system according to a first embodiment of the present invention and the loads of the electricity consuming field are connected to the power grid.

A power control system 1 according to a first embodiment of the present invention is illustrated in FIG. 2 and is applied to an electricity consuming field, wherein the electricity consuming field could be, but not limited to, a residential building, an office building, a factory, etc.

An electricity consumption metering device 20 and a plurality of loads 22 are disposed in the electricity consuming field, wherein the loads 22 are connected to a power grid via the electricity consumption metering device 20, and the electricity consumption metering device 20 records an electricity consumption of the loads 22. In the current embodiment, the electricity consumption metering device 20 includes a plurality of electric meters 202, wherein the electric meters 202 could be, for example, an intelligent meter connected to a communication network 24. The communication network 24 could be, for example, an internet or a local area network. Each of the electric meters 202 is connected to at least one of the loads 22, and the electric meters 202 are connected to the power grid via a switch device 26, wherein the switch device 26 is an overload protection switch for tripping when a passing current is greater than a predetermined current.

The loads 22 include, but not limited to, the elevator, the lighting equipment, communication equipment (e.g. the network equipment and the telecommunication equipment), the water pump of the water tower, the standby charging energy storage cabinet, the air conditioning equipment, the vehicle charging station, the indoor emergency lighting equipment, etc., wherein the loads 22 are connected to the communication network 24.

Additionally, a plurality of detecting devices 28 is selectively disposed in the electricity consuming field, wherein each of the detecting devices 28 detects whether one of the loads 22 needs to be run, and generates an operation request signal when the corresponding one of the loads 22 needs to be run, thereby requesting to start the corresponding one of the loads 22 or requesting to adjust a power consumption of the corresponding one of the loads 22 in operation (e.g. increasing the power consumption). For instance, one of the detecting devices 28 corresponding to the water pump of the water tower could be a level monitor disposed in the water tower, and could generate the operation request signal when water of the water tower is at a low water level. For instance, one of the detecting devices 28 corresponding to the air conditioning equipment could be an indoor temperature sensor, and could generate the operation request signal when the temperature sensor detects that an indoor temperature is too high, thereby requesting to start the air conditioning equipment or requesting to increase a power consumption of the air conditioning equipment to cool down the indoor temperature faster. The detecting devices 28 could communicates with the communication network 24 to send the operation request signal.

In an embodiment, a part of the loads 22 could generate the operation request signal by itself when it needs to run and send the operation request signal via the communication network 24. For instance, the standby charging energy storage cabinet generates the operation request signal to request charging when a voltage of an internal accumulator is insufficient. For instance, the vehicle charging station generates the operation request signal to request outputting a charging power to an electric vehicle when the vehicle charging station is connected to the electric vehicle.

Figure 3:
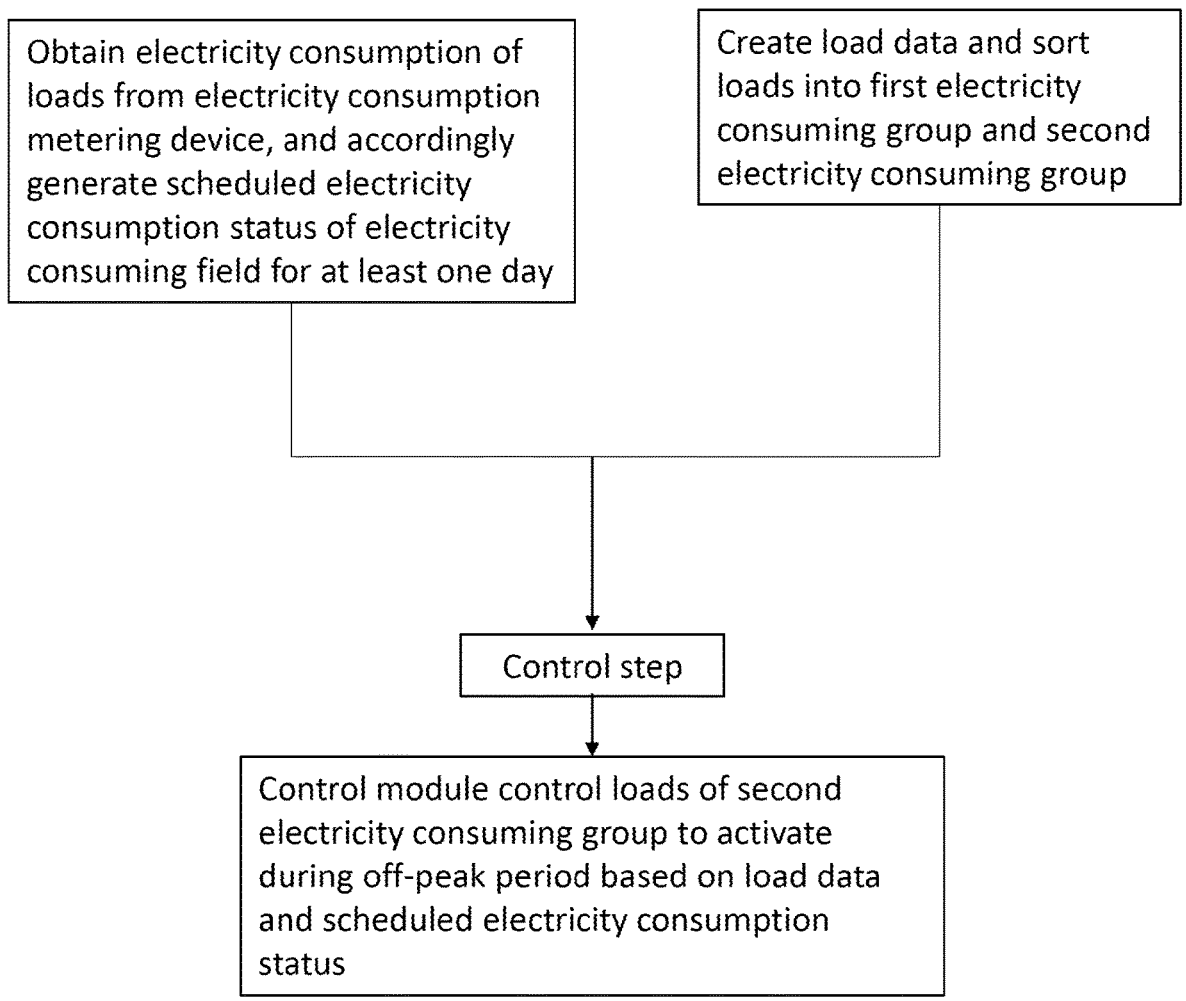
FIG. 3 is a flowchart of the power control method according to the first embodiment of the present invention.

The power control system 1 includes a processing module 10, a database 12, and a control module 14 and is adapted to apply a power control method according to the first embodiment of the present invention shown in FIG. 3. The power control method will be explained together with the power control system 1 as follow.

The processing module 10 is wirelessly connected to the electricity consumption metering device 20, the database 12, and the control module 14, wherein the processing module 10 obtains an electricity consumption of the loads 22 from the electricity consumption metering device 20, and generates a scheduled electricity consumption status in at least one electricity consuming period of the electricity consuming field according to the obtained electricity consumption that the loads 22 operate for a period of time. The scheduled electricity consumption status includes at least one peak period and at least one off-peak period.

In the current embodiment, the processing module 10 is connected to the communication network 24 and communicates with the electric meters 202, thereby continuously obtain the electricity consumption of the connected loads 22 from the electric meters 202. The processing module 10 stores the obtained electricity consumption of the loads 22 in the database 12, and counts an electricity consumption for a period of time, and forecasts a scheduled electricity consumption status of at least one electricity consuming period, wherein the aforementioned period of time could be several days, several weeks, several months, or several years. In the current embodiment, the electricity consuming period takes one day (i.e., 24 hours) as an example. However, the electricity consuming period could be several hours (e.g. 6-12 hours) as well. The processing module 10 obtains the scheduled electricity consumption status on various days, including a scheduled electricity consumption status of a working day and a scheduled electricity consumption status of a holiday. For instance, average the electricity consumption for each period of several working days in a period, and average the electricity consumption for each period of several holidays in a period, wherein the aforementioned each period could be every 1-60 minutes on weekdays or holidays (e.g. every 10 minutes, every 15 minutes, every 30 minutes, or every 60 minutes). The processing module 10 stores the scheduled electricity consumption status of various days in the database 12. In the scheduled electricity consumption status on different days, the number of the peak period and the number of the off-peak period are different, and the time of the peak period and the time of the off-peak period are also different, wherein the number and the time of the peak period and the number and the time of the off-peak period are consistent with an electricity consuming habit in the electricity consuming field. In an embodiment, the processing module 10 could further collect a weather data and generate a scheduled electricity consumption status for a working day and a holiday in different seasons and different weathers according to the seasons and the weathers.

Figure 4:
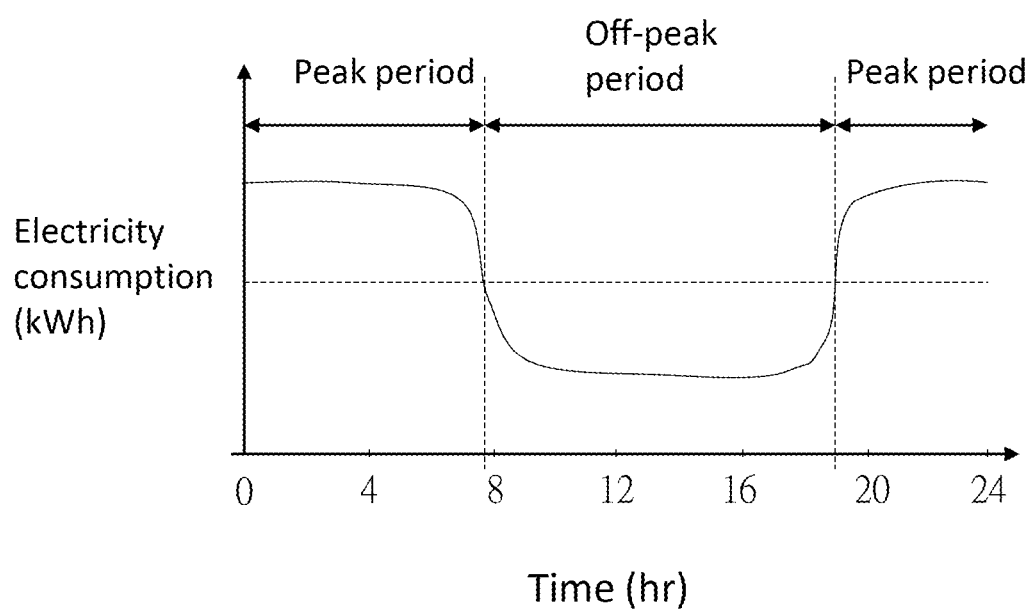
FIG. 4 is a schematic view, showing the scheduled electricity consumption status according to the first embodiment of the present invention.

A scheduled electricity consumption status on a working day is illustrated in FIG. 4 and is represented by a curve, wherein the scheduled electricity consumption status for 24 hours in a day includes two peak periods and an off-peak period.

A load data is stored in the database 12 and sorts the loads 22 into at least a first electricity consuming group and a second electricity consuming group, wherein the loads of the first electricity consuming group are defined as an essential load that is allowed to operate during both of the peak period and the off-peak period, while the loads 22 of the second electricity consuming group are defined as a non-essential load that is allowed to selectively operate during the peak period or the off-peak period.

For instance, the loads 22 of the first electricity consuming group could be, for example, the elevator, the lighting equipment, communication equipment (e.g. the network equipment and the telecommunication equipment), the indoor emergency lighting equipment, etc.; the loads 22 of the second electricity consuming group could be, for example, the water pump of the water tower, the standby charging energy storage cabinet, the air conditioning equipment, the vehicle charging station, etc.

The load data could be classified by a manager in advance and created in the database 12 by connecting with the power control system 1 via an electronic device, wherein the step of creating the load data is not limited to be taken after the step that the processing module 10 generates the scheduled electricity consumption status, but could be taken before or simultaneously the step that the processing module 10 generates the scheduled electricity consumption status.

The control module 14 is wirelessly connected to the loads 22, the processing module 10, and the database 12. In the current embodiment, the control module 14 communicates with the loads 22 via the communication network 24 to control the loads 22 to run or stop, wherein the run includes start the loads 22 or adjust a power consumption of the loads 22 in operation. The control module 14 is configured to take a control step, wherein in the control step, the control module 14 controls the loads 22 of the second electricity consuming group to run during the off-peak period based on the load data and the scheduled electricity consumption status. In the current embodiment, the control module 14 obtains the scheduled status data of the current day, wherein the scheduled status data could be obtained from the processing module 10 or the database 12; for example, the scheduled status data corresponding to a working day or a holiday could be selected. In an embodiment, the scheduled status data of an electricity consuming period corresponding to the current season and the current weather could be further selected according to the weather data of the current day.

When each of the loads 22 needs to be run (e.g. when the control module 14 receives the operation request signal corresponding to any one of the loads 22), and the control module 14 determines that one of the loads 22 corresponding to the received operation request signal belongs to the second electricity consuming group and the current time falls in the off-peak period, the control module 14 outputs a running signal to one of the loads 22 corresponding to the received operation request signal to control the corresponding load 22 to run (e.g. control the load to start or to adjust a power consumption of the load in operation), wherein the operation request signal of each of the loads 22 comes from each of the loads 22 itself or the corresponding one of the detecting devices 28.

When the control module 14 determines that one of the loads 22 corresponding to the operation request signal belongs to the second electricity consuming group and the current time falls in the peak period, the control module 14 temporarily does not control the load 22 corresponding to the operation request signal to run, until the current time falls within the off-peak period, the control module 14 outputs the running signal to the corresponding load 22 to control the load 22 corresponding to the received operation request signal to run in the off-peak period.

Additionally, when the loads of the first electricity consuming group need to be run, and the control module 14 determines that one of the loads 22 corresponding to the received operation request signal belongs to the first electricity consuming group, the control module 14 allows the loads 22 of the first electricity consuming group to run no matter when in the peak period or the off-peak period by outputting a running signal to control the loads 22 of the first electricity consuming group to run or by allowing the loads 22 of the first electricity consuming group to run under an additional control (e.g. a user directly operates the load 22 to run).

In this way, the loads 22 of the second electricity consuming group (i.e., the non-essential load) could be restricted to run during the off-peak period, thereby avoiding too many loads 22 run in the peak period and improving the conventional overload problem during the peak period.

Figure 5:
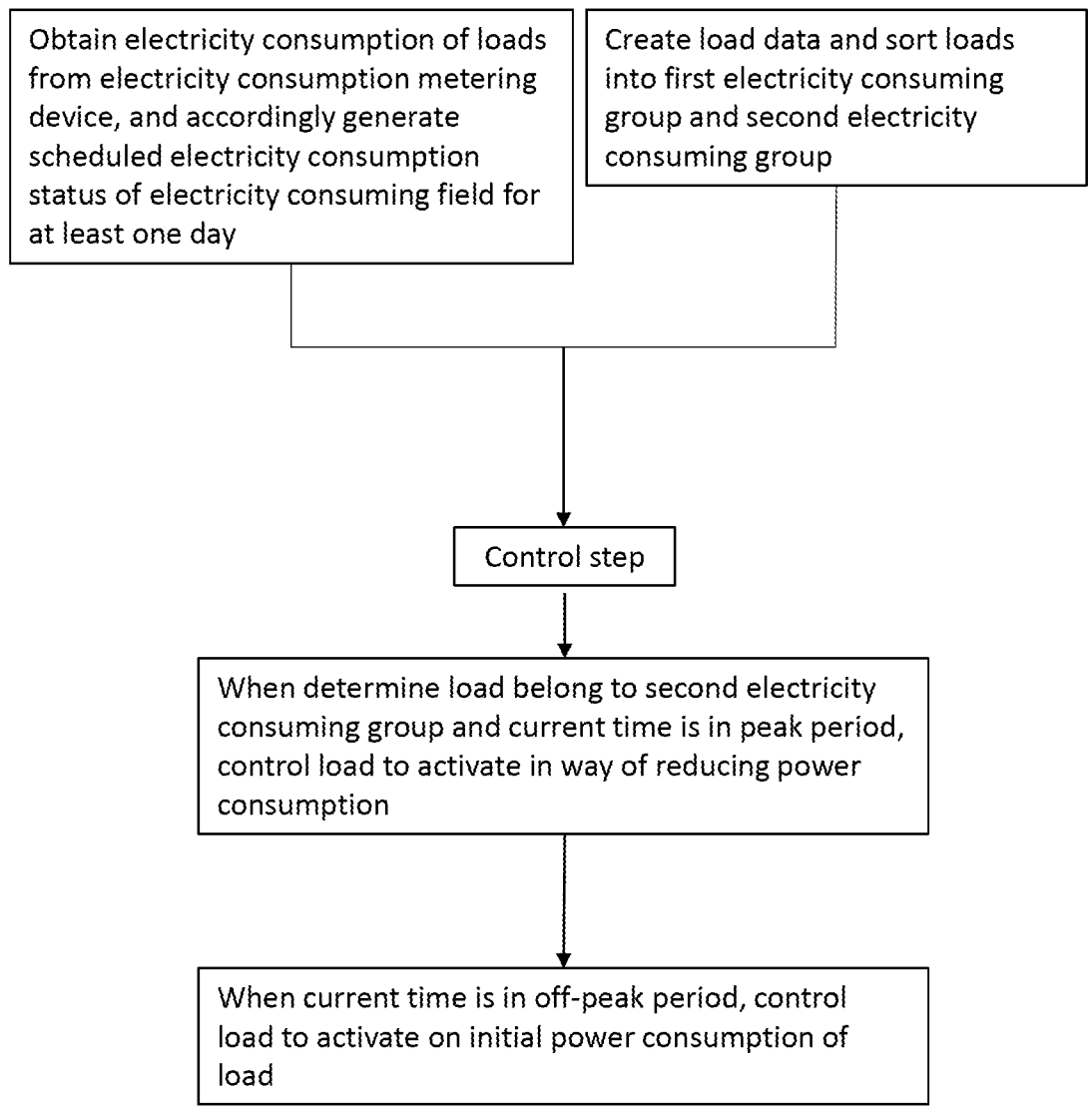
FIG. 5 is a flowchart of the power control method according to a second embodiment of the present invention.

A power control method according to a second embodiment of the present invention is illustrated in FIG. 5 and is applied to the power control system 1 of the first embodiment, which has almost the same steps as that of the first embodiment, except that in the control step, when the control module 14 receives an operation request signal corresponding to any one of the loads 22 and determines that the load 22 corresponding to the received operation request signal belongs to the second electricity consuming group and the current time falls in the peak period, the control module 14 controls the load 22 corresponding to the received operation request signal to run in a way of reducing a power consumption thereof.

For instance, one of the loads 22 of the second electricity consuming group is the vehicle charging station as an example, the load 22 (i.e., the vehicle charging station) could operate in a first power consumption and a second power consumption, wherein the first power consumption is greater than the second power consumption; the electric vehicle connected to the vehicle charging station is charged by a high current fast charging when the vehicle charging station operates in the first power consumption, and is charged by a normal current charging when the vehicle charging station operates in the second power consumption. When the control module 14 receives an operation request signal corresponding to the vehicle charging station and the current time falls in the peak period, the running signal outputted by the control module 14 includes a load shedding command. When the vehicle charging station receives the running signal including the load shedding command, the vehicle charging station runs in the second power consumption (i.e., charging the electric vehicle in a smaller current), thereby reducing a total power consumption of the loads 22 during the peak period.

After that, the control module 14 controls the load 22 corresponding to the received operation request signal to run in an initial power consumption thereof when the current time falls in the off-peak period. In the current embodiment, the running signal outputted by the control module 14 includes a restore command, wherein when the vehicle charging station receives the running signal including the restore command, the vehicle charging station runs in the first power consumption (i.e., charging the electric vehicle in a high current), thereby restoring an original fast charging function of the vehicle charging station.

Figure 6:
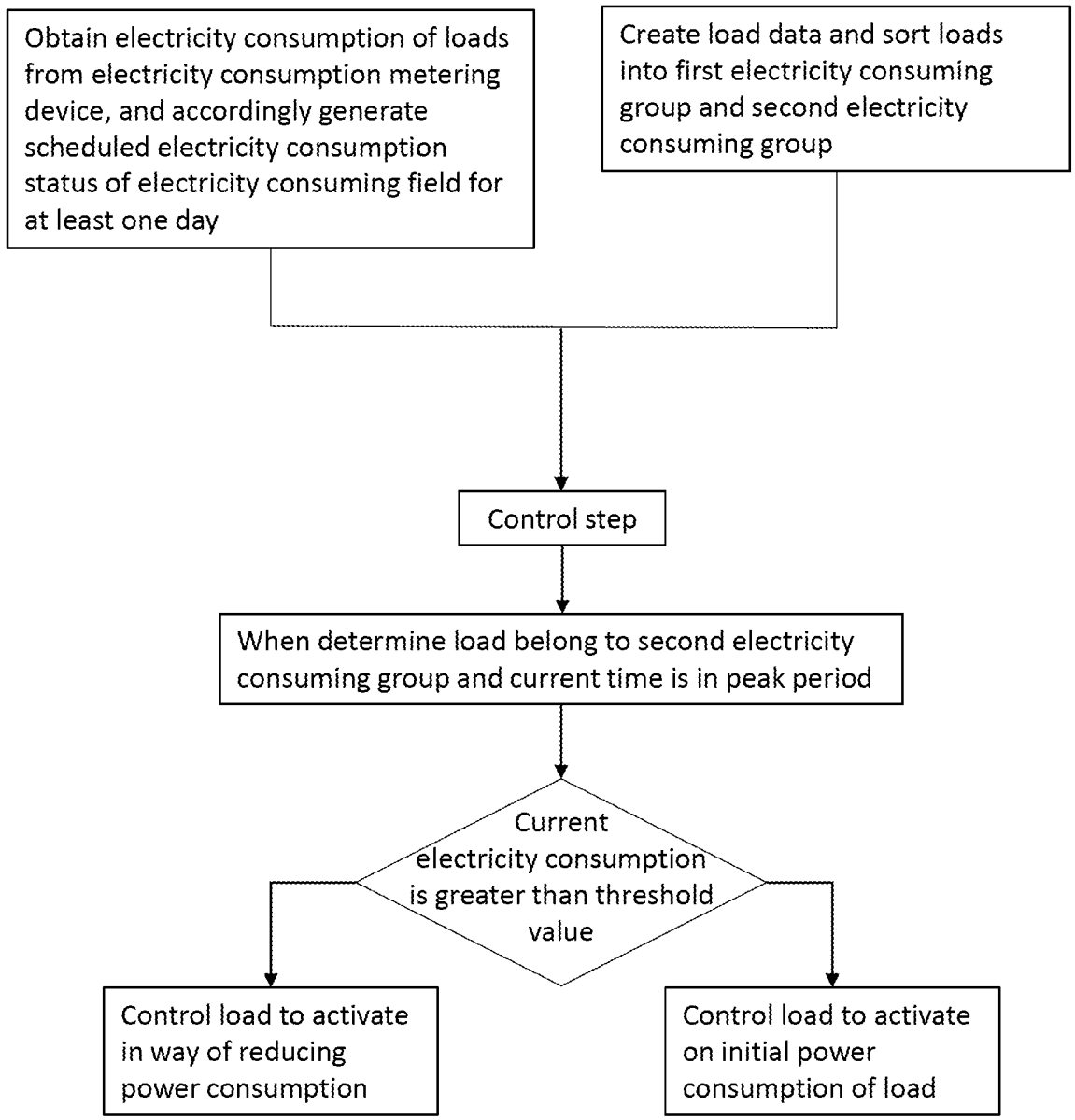
FIG. 6 is a flowchart of the power control method according to a third embodiment of the present invention.

A power control method according to a third embodiment of the present invention is illustrated in FIG. 6 and is applied to the power control system 1 of the first embodiment, which has almost the same steps as that of the second embodiment, except that in the control step, when the control module 14 receives an operation request signal corresponding to anyone of the loads 22 and determines that the load 22 corresponding to the received operation request signal belongs to the second electricity consuming group and the current time falls in the peak period, the control module 14 further determines that whether a current electricity consumption of the loads 22 obtained by the processing module 10 is greater than a threshold value, wherein the control module 14 controls the load 22 corresponding to the received operation request signal to run in a way of reducing a power consumption thereof when the current electricity consumption of the loads 22 obtained by the processing module 10 is greater than the threshold value, and controls the load 22 corresponding to the received operation request signal to run in an initial power consumption thereof when the control module 14 determines that the current electricity consumption of the loads 22 obtained by the processing module 10 is smaller than the threshold value.

For instance, the control module 14 obtains a current electricity consumption of the loads 22 in the peak period from the processing module 10, wherein when the current electricity consumption is greater than the threshold value, the running signal outputted by the control module 14 includes a load shedding command to command the vehicle charging station to run in the second power consumption (i.e., charging the electric vehicle in a smaller current), thereby avoiding a total power consumption of the loads 22 is too high during the peak period, while when the current electricity consumption is smaller than or equal to the threshold value, the running signal does not include the load shedding command, so that the vehicle charging station runs in the first power consumption (i.e., charging the electric vehicle in a high current), thereby restoring an original fast charging function of the vehicle charging station.

Figure 7:
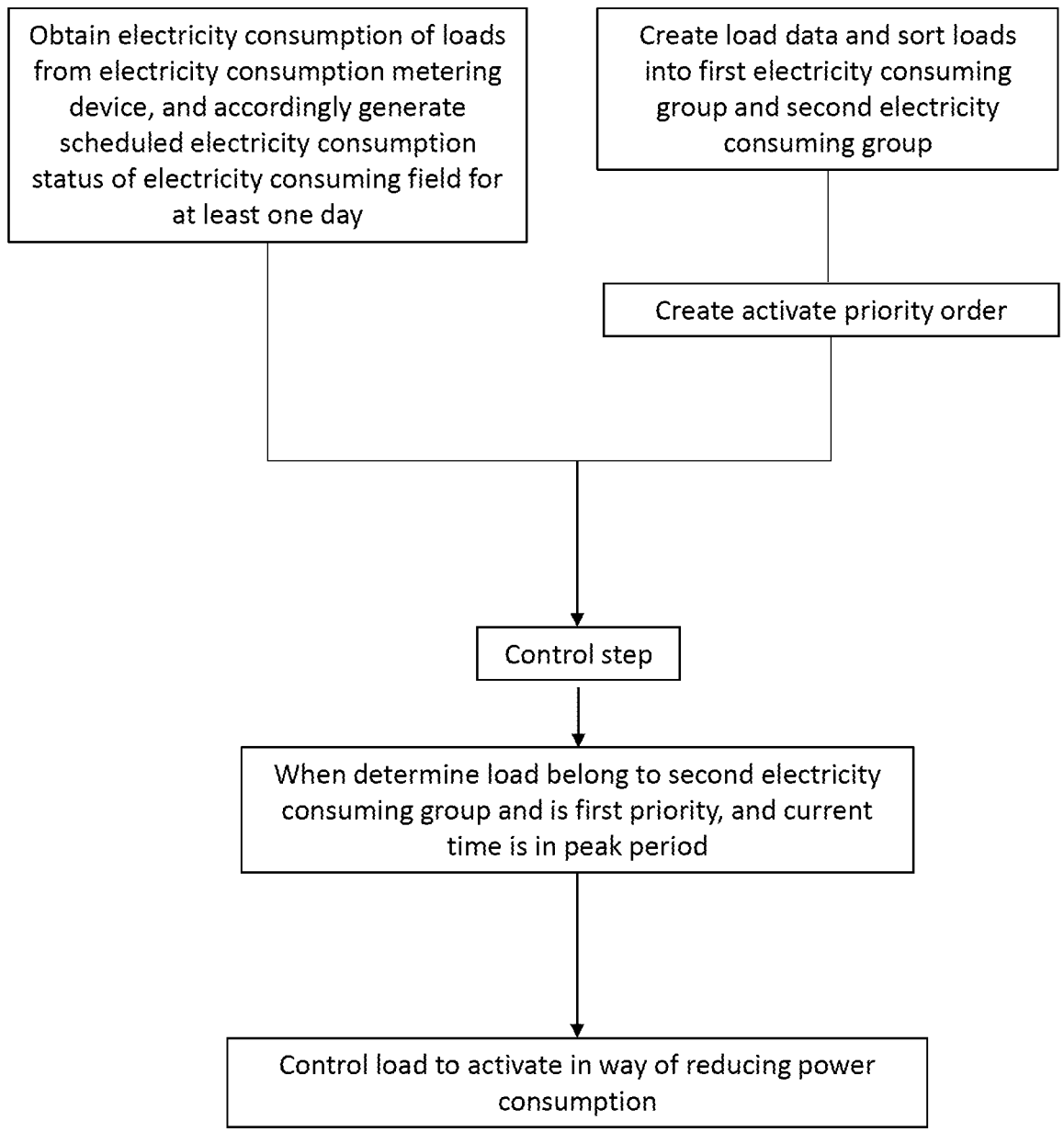
FIG. 7 is a flowchart of the power control method according to a fourth embodiment of the present invention.

A power control method according to a fourth embodiment of the present invention is illustrated in FIG. 7, and is applied to the power control system 1 of the first embodiment, which has almost the same steps as that of the second embodiment, except that further create an activate priority order of each of the loads 22 of the second electricity consuming group in the load data of the database 12, wherein the activate priority order of each of the loads 22 of the second electricity consuming group at least includes either a first priority or a second priority. Referring to following table 1, the activate priority order could be classified by a manager in advance and created in the load data of the database 12.

TABLE 1

| Loads | Activate priority order |
| --- | --- |
| water pump of water tower | First priority |
| standby charging energy storage cabinet | Second priority |
| air conditioning equipment | Second priority |
| vehicle charging station | First priority |

In the control step of the current embodiment, when the control module 14 receives an operation request signal of any one of the loads 22 and determines that the load 22 corresponding to the received operation request signal belongs to the second electricity consuming group and the activate priority order of the corresponding load is the first priority and the current time falls in the peak period, the control module 14 controls the load 22 corresponding to the received operation request signal to run in a way of reducing a power consumption thereof (e.g. the vehicle charging station charges the electric vehicle in a smaller current).

While when the activate priority order of the corresponding load is the second priority, the control module 14 temporarily does not control the load 22 corresponding to the received operation request signal to run, until the current time falls within the off-peak period, the control module 14 controls the corresponding load 22 to run (e.g. delay the operation for charging of the standby charging energy storage cabinet until the off-peak period).

In this way, a part of the loads 22 of the second electricity consuming group could operate with the smaller power consumption in the peak period when needed, thereby preventing a total power consumption of the loads 22 from being affected.

Figure 8:
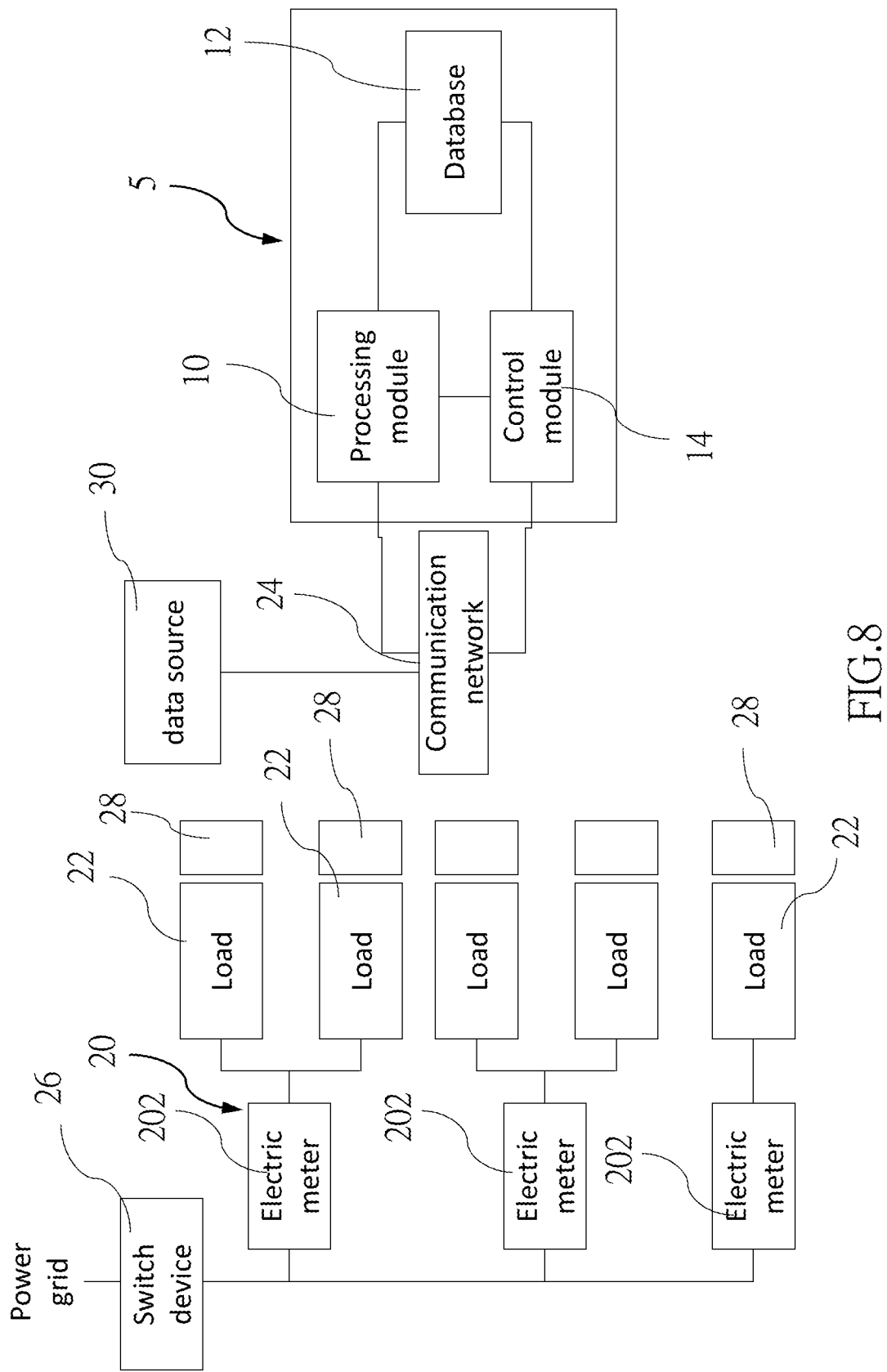
FIG. 8 is a block diagram, showing both of the power control system according to a fifth embodiment of the present invention and the loads of the electricity consuming field are connected to the power grid.

A power control system 5 according to a fifth embodiment of the present invention is illustrated in FIG. 8, which is based on that of the first embodiment, except that the processing module 10 is wirelessly connected to at least one data source 30. A power control method of the current embodiment is based on that of the fourth embodiment, except that further comprising: the processing module 10 receives an environmental incident information from the data source 30 and adjusts the activate priority order of the loads 22 of the second electricity consuming group in the load data of the database 12 based on the environmental incident information.

In the current embodiment, the at least one data source 30 includes at least one public information website, such as the websites of electric power companies, water companies, weather bureaus, etc., wherein the environmental incident information that the processing module 10 obtains from the data source 30 includes power outage information, water outage information, meteorological information (wind disaster, low temperature, high temperature, earthquake, flood, torrential rain, etc.), etc. The data source 30 could be an electronic device of a manager of the electricity consuming field, wherein the manager collects the aforementioned environmental incident information through the electronic device and transmits the environmental incident information to the processing module 10, and the processing module 10 adjusts the activate priority order of the loads 22 of the second electricity consuming group based on the received environmental incident information. The aforementioned environmental incident information includes a time that the environmental incident occurred (e.g. the power outage information includes an estimated beginning and expiry time of the outage of the power consuming field).

More specifically, a plurality of different predetermined environmental incident information types is stored in the database 12, and the loads 22 of the second electricity consuming group have a different activate priority order for each of the predetermined environmental incident information types. Referring to following Table 2, the predetermined environmental incident information types are power outage, water outage, and high temperature as an example, at least a part of the loads 22 has different activate priority orders for the different predetermined environmental incident information types.

TABLE 2

| | Predetermined environmental incident information types | | |
|---|---|---|---|
| | Power outage | Water outage | High temperature |
| Loads | Activate priority order | Activate priority order | Activate priority order |
| water pump of water tower | First priority | First priority | First priority |
| standby charging energy storage cabinet | First priority | Second priority | Second priority |
| air conditioning equipment | Second priority | Second priority | First priority |
| vehicle charging station | First priority | First priority | First priority |

When the processing module 10 determines that the received environmental incident information matches with one of the predetermined environmental incident information types, the processing module 10 adjusts the activate priority order of the loads 22 of the second electricity consuming group based on one of the predetermined environmental incident information types that conform to the environmental incident information. For instance, when the received environmental incident information is the power outage information, the processing module 10 determines that the predetermined environmental incident information type is power outage, and adjusts the activate priority order of the loads 22 of the second electricity consuming group based on the predetermined environmental incident information type corresponding to power outage, several hours before the power outage (e.g. 6-12 hours before), wherein in the current example, the activate priority order of the water pump of the water tower, the activate priority order of the standby charging energy storage cabinet, and the activate priority order of the vehicle charging station are adjusted to the first priority. In this way, even the time of several hours before the occurrence of the environmental incident falls within the peak period, the control module 14 could control the loads 22 of the second electricity consuming group to operate with the smaller power consumption in the peak period when the control module 14 receives the operation request signal corresponding to the loads 22 of the second electricity consuming group, thereby in preparation for the environmental incident.

With the aforementioned design, the power control system and the power control method of the present invention could classify the loads of the electricity consuming field, thereby restricting a part of the loads to run during the off-peak period, avoiding too many loads run in the peak period that may cause excessive power consumption, effectively avoiding the situation that the switch device trips or the instantaneous electricity consumption exceeds the electric quantity specified by the contract electricity capacity.

It must be pointed out that the embodiments described above are only some preferred embodiments of the present invention. All equivalent structures and methods which employ the concepts disclosed in this specification and the appended claims should fall within the scope of the present invention.

What is claimed is:

1. A power control system, which is applied to an electricity consuming field, wherein an electricity consumption metering device and a plurality of loads are disposed in the electricity consuming field; the loads are connected to a power grid via the electricity consumption metering device, and the electricity consumption metering device is configured to record an electricity consumption of the loads; the power control system comprising:

a processing module, which is wirelessly connected to the electricity consumption metering device for obtaining the electricity consumption of the loads, wherein the processing module generates a scheduled electricity consumption status in at least one electricity consuming period of the electricity consuming field according to the obtained electricity consumption that the loads operate for a period of time; the scheduled electricity consumption status includes a peak period and an off-peak period;

a database, wherein a load data is stored in the database and sorts the loads into at least a first electricity consuming group and a second electricity consuming group; the loads of the first electricity consuming group are allowed to operate during both the peak period and the off-peak period; the loads of the second electricity consuming group selectively operate during the peak period or the off-peak period; and a control module, which is wirelessly connected to the loads, the processing module, and the database, wherein the control module controls the loads of the second electricity consuming group to run during the off-peak period based on the load data and the scheduled electricity consumption status;

wherein when the control module receives an operation request signal corresponding to any one of the loads and determines that one of the loads corresponding to the received operation request signal belongs to the second electricity consuming group and a current time falls within the off-peak period, the control module correspondingly controls one of the loads corresponding to the received operation request signal to run;

when the control module receives the operation request signal corresponding to any one of the loads and determines that the one of the loads corresponding to the received operation request signal belongs to the second electricity consuming group and a current time falls within the peak period, the control module controls one of the loads corresponding to the received operation request signal to run in a way of reducing a power consumption of the corresponding load when the control module determines that a current electricity consumption of the loads obtained by the processing module is greater than a threshold value, and controls one of the loads corresponding to the received operation request signal to run in an initial power consumption of the corresponding load when the control module determines that a current electricity consumption of the loads obtained by the processing module is smaller than the threshold value.

2. A power control system, which is applied to an electricity consuming field, wherein an electricity consumption metering device and a plurality of loads are disposed in the electricity consuming field; the loads are connected to a power grid via the electricity consumption metering device, and the electricity consumption metering device is configured to record an electricity consumption of the loads; the power control system comprising:

a processing module, which is wirelessly connected to the electricity consumption metering device for obtaining the electricity consumption of the loads, wherein the processing module generates a scheduled electricity consumption status in at least one electricity consuming period of the electricity consuming field according to the obtained electricity consumption that the loads operate for a period of time; the scheduled electricity consumption status includes a peak period and an off-peak period;

a database, wherein a load data is stored in the database and sorts the loads into at least a first electricity consuming group and a second electricity consuming group; the loads of the first electricity consuming group are allowed to operate during both the peak period and the off-peak period; the loads of the second electricity consuming group selectively operate during the peak period or the off-peak period; and a control module, which is wirelessly connected to the loads, the processing module, and the database, wherein the control module controls the loads of the second electricity consuming group to run during the off-peak period based on the load data and the scheduled electricity consumption status;

wherein when the control module receives an operation request signal corresponding to any one of the loads and determines that one of the loads corresponding to the received operation request signal belongs to the second electricity consuming group and a current time falls within the off-peak period, the control module correspondingly controls one of the loads corresponding to the received operation request signal to run;

wherein the loads of the second electricity consuming group in the load data of the database have an activate priority order; the activate priority order of each of the loads of the second electricity consuming group at least includes either a first priority or a second priority; when the control module receives the operation request signal corresponding to any one of the loads and determines that the one of the loads corresponding to the received operation request signal belongs to the second electricity consuming group and a current time falls within the peak period, the control module controls one of the loads corresponding to the received operation request signal to run in a way of reducing a power consumption of the corresponding load when the activate priority order of the corresponding load is the first priority, and the control module does not control the corresponding load to run when the activate priority order of the corresponding load is the second priority, until a current time falls within the off-peak period, the control module controls the corresponding load to run.

3. The power control system as claimed in claim 2, wherein the processing module is wirelessly connected to a data source for receiving an environmental incident information from the data source, and adjusts the activate priority order of the loads of the second electricity consuming group in the load data based on the environmental incident information.

4. The power control system as claimed in claim 3, wherein a plurality of different predetermined environmental incident information types is stored in the database; the loads of the second electricity consuming group have different activate priority orders for each of the predetermined environmental incident information types; when the processing module determines that the received environmental incident information matches with one of the predetermined environmental incident information types, the processing module adjusts the activate priority order of the loads of the second electricity consuming group based on one of the predetermined environmental incident information types that conform to the environmental incident information.

5. A power control method, which is applied to an electricity consuming field, wherein an electricity consumption metering device and a plurality of loads are disposed in the electricity consuming field; the loads are connected to a power grid via the electricity consumption metering device, and the electricity consumption metering device is configured to record an electricity consumption of the loads; the power control method comprising:

obtaining the electricity consumption of the loads from the electricity consumption metering device through a processing module, and generating a scheduled electricity consumption status in at least one electricity consuming period of the electricity consuming field according to the obtained electricity consumption that the loads operate for a period of time through the processing module, wherein the scheduled electricity consumption status comprises a peak period and an off-peak period;

creating a load data that sorts the loads into at least a first electricity consuming group and a second electricity consuming group, wherein the loads of the first electricity consuming group are allowed to operate during both the peak period and the off-peak period, while the loads of the second electricity consuming group selectively operate during the peak period or the off-peak period; and a control step comprising controlling the loads of the second electricity consuming group to run during the off-peak period through a control module based on the load data and the scheduled electricity consumption status;

wherein in the control step, when the control module receives an operation request signal corresponding to any one of the loads and determines that one of the loads corresponding to the received operation request signal belongs to the second electricity consuming group and a current time falls within the off-peak period, the control module controls one of the loads corresponding to the received operation request signal to run;

wherein in the control step, when the control module receives the operation request signal corresponding to anyone of the loads and determines that the one of the loads corresponding to the received operation request signal belongs to the second electricity consuming group and a current time falls within the peak period, the control module controls one of the loads corresponding to the received operation request signal to run in a way of reducing a power consumption of the corresponding load when the control module determines that a current electricity consumption of the loads obtained by the processing module is greater than a threshold value, and controls one of the loads corresponding to the received operation request signal to run in an initial power consumption of the corresponding load when the control module determines that a current electricity consumption of the loads obtained by the processing module is smaller than the threshold value.

6. A power control method, which is applied to an electricity consuming field, wherein an electricity consumption metering device and a plurality of loads are disposed in the electricity consuming field; the loads are connected to a power grid via the electricity consumption metering device, and the electricity consumption metering device is configured to record an electricity consumption of the loads; the power control method comprising:

obtaining the electricity consumption of the loads from the electricity consumption metering device through a processing module, and generating a scheduled electricity consumption status in at least one electricity consuming period of the electricity consuming field according to the obtained electricity consumption that the loads operate for a period of time through the processing module, wherein the scheduled electricity consumption status comprises a peak period and an off-peak period;

creating a load data that sorts the loads into at least a first electricity consuming group and a second electricity consuming group, wherein the loads of the first electricity consuming group are allowed to operate during both the peak period and the off-peak period, while the loads of the second electricity consuming group selectively operate during the peak period or the off-peak period; and a control step comprising controlling the loads of the second electricity consuming group to run during the off-peak period through a control module based on the load data and the scheduled electricity consumption status;

wherein in the control step, when the control module receives an operation request signal corresponding to any one of the loads and determines that one of the loads corresponding to the received operation request signal belongs to the second electricity consuming group and a current time falls within the off-peak period, the control module controls one of the loads corresponding to the received operation request signal to run;

wherein the power control method further comprises creating an activate priority order of the loads of the second electricity consuming group in the load data, wherein the activate priority order of each of the loads of the second electricity consuming group at least includes either a first priority or a second priority; in the control step, when the control module receives the operation request signal corresponding to any one of the loads and determines that the one of the loads corresponding to the received operation request signal belongs to the second electricity consuming group and a current time falls within the peak period, the control module controls one of the loads corresponding to the received operation request signal to run in a way of reducing a power consumption of the corresponding load when the activate priority order of the corresponding load is the first priority, and the control module does not control the corresponding load to run when the activate priority order of the corresponding load is the second priority, until a current time falls within the off-peak period, the control module controls the corresponding load to run.

7. The method as claimed in claim 6, further comprising receiving an environmental incident information from a data source through the processing module, and adjusting the activate priority order of the loads of the second electricity consuming group in the load data based on the environmental incident information.

8. The method as claimed in claim 7, further comprising creating a plurality of different predetermined environmental incident information types, wherein the loads of the second electricity consuming group have different activate priority orders for each of the predetermined environmental incident information types; when the processing module determines that the received environmental incident information matches with one of the predetermined environmental incident information types, the processing module adjusts the activate priority order of the loads of the second electricity consuming group based on one of the predetermined environmental incident information types that conform to the environmental incident information.

* * * * *